July 8, 1924.

J. F. VALKENBURGH 1,500,427

INSTRUMENT FOR DIVIDING AND MULTIPLYING ANGLES

Filed Jan. 8, 1921

Inventor
J. F. Valkenburgh

Patented July 8, 1924.

1,500,427

UNITED STATES PATENT OFFICE.

JOHANNES FREDERIK VALKENBURGH, OF THE HAGUE, NETHERLANDS.

INSTRUMENT FOR DIVIDING AND MULTIPLYING ANGLES.

Application filed January 8, 1921. Serial No. 435,848.

*To all whom it may concern:*

Be it known that I, JOHANNES FREDERIK VALKENBURGH, a subject of the Netherlands, residing at The Hague, Netherlands, have invented certain new and useful Improvements in Instruments for Dividing and Multiplying Angles, of which the following is a specification.

For dividing and multiplying angles, setting off or developing straight lines and arcs upon straight lines or arcs etc., it has been suggested to employ an instrument comprising in combination two indicators rotatably mounted on a common axis and each having its free end connected with a cord or string, a ring secured to said axis and having two grooves of equal diameter arranged axially side by side to serve as guide ways for the strings, and a lever which is coupled with the strings and adapted to move in a predetermined path in such a manner as to ensure a fixed but adjustable ratio between the distances through which the fastening points of the strings on the said lever are moved, the arrangement being so that the strings during this movement conform themselves to the paths of said points.

Starting from the underlying principle of the above described construction the present invention has for its object a much simpler apparatus for carrying out the required planimetric manipulations. With this object in view I make use of the property that in a circle angles at the circumference and also angles at the centre on equal arcs are all of equal size; in view of this property an instrument according to my present invention comprises an indicator which is rotatable about a fixed axis and connected with a rectilinearly guided member in such a manner that a displacement of said member along its guide way produces a proportionate angular displacement of the indicator, and/or vice versa. In a special embodiment of my invention, the indicator is movable along a circular track which has its centre in the indicator axis, and connected with the rectilinearly guided member by a string which is guided along said track. In another embodiment the indicator is provided with a gear wheel or a toothed segment having its centre in the said axis of rotation and cooperating with a rack on the rectilinearly guided member.

Figure 1:
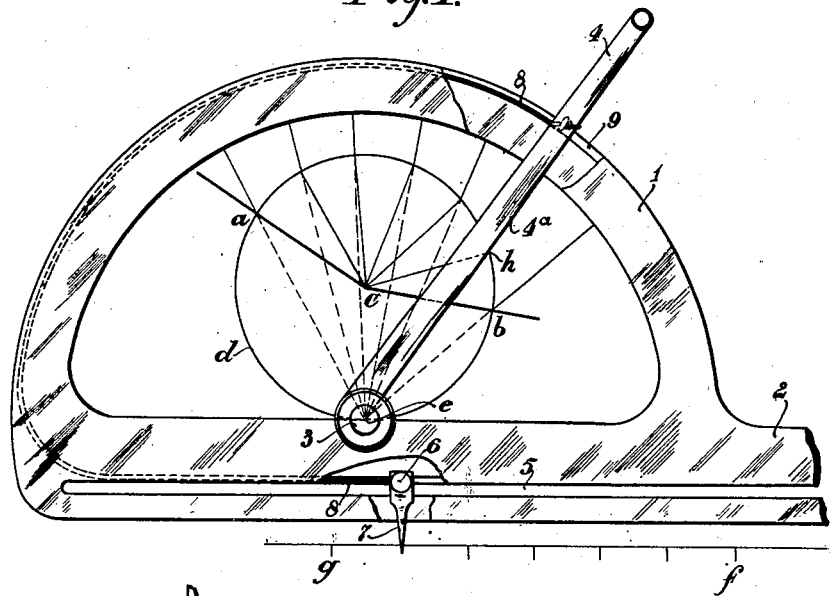
Fig. 1 is a plan, partly in section, illustrating the preferred form of instrument.
Figure 3:
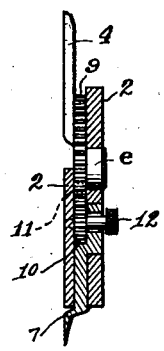
Fig. 3 is a section on line 3—3 of Fig. 2.

Fig. 1 of the annexed drawing shows a view, partly in section, of an instrument according to my invention. This instrument comprises a flat semi-circular ring 1 integral with a ruler 2. In the centre of ring 1 is an axis 3 having a sharp point at its lower end and rotatable about this axis is an indicator 4 adapted when rotating to slide over said ring. The straight edge $4^a$ of the indicator is radial relative to the axis of rotation. The ruler 2 is provided with a straight groove 5 serving as a runway for a block 6 connected with a pointer 7 which projects from the ruler. The indicator 4 is connected with the block 6 through a cord or string 8 lying in a groove 9 cut in the ring 1 and having its centre in the axis 3.

When I desire to employ the described instrument for dividing an angle $acb$ into say six equal parts, I draw on a sheet of paper a circle $d$ having its centre in $c$ and having any suitable radius, whereupon I press the sharp point of the axis 3 into the paper in a point $e$ of the circumference of the circle $d$. Then I first turn the edge $4^a$ of the indicator 4 exactly along the line $ea$ and subsequently move the block 6 until the string 8 is stretched. Upon a straight line run in parallel relation with the groove 5 and tangential to the free end of the pointer 7 I now mark the point $f$ indicated by the said pointer and I then move the indicator 4 in a clock-wise direction until its edge $4^a$ is exactly along the line $eb$. I now mark upon said straight line the point $g$ indicated by the pointer 7 whereupon I divide the distance $fg$ into six equal parts in a manner well-known to those skilled in the art. When I now move the block 6 to the right until the pointer 7 has reached the first division point on line $gf$ and run along the edge $4^a$ a line which intersects the circumference $d$ in $h$, the angle $beh$ is equal to the one-sixth part of the angle

*aeb*, and the angle *hcb* is the one-sixth part of the angle *acb*. A proof for this thesis may be considered as being superfluous.

Neither is it necessary to furnish any further explanation as to the manner in which to multiply a given angle and perform other manipulations by means of the described instrument.

When it is desired to avoid the use of a string, the block 6 may be connected with a rack arranged in parallel relation with the groove 5 and co-operating with a gear wheel or a toothed segment on the indicator 4 with its centre in the axis of rotation thereof. Also in this case the rectilinear displacements of the pointer 7 are at all times proportionate to the angular displacements of the indicator 4.

Figure 2:
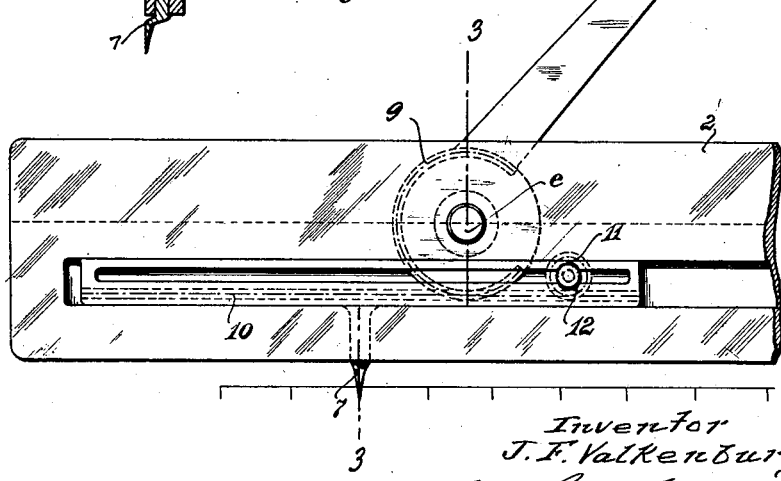
Fig. 2 is a similar view of a modified form.

Figure 2 of the drawing illustrates this second embodiment of the invention. In this figure, 9 is a toothed segment integral with the indicator 4 and having its centre in *e;* said toothed segment 9 meshes with a rack 10 slidably mounted in the instrument and carrying the pointer 7. A pinion 11 in mesh with the rack 10 serves for imparting to the latter the required motion in the one or the other direction. The pinion 11 can be turned by means of a knob 12.

What I claim is:

1. An instrument of the class described, an element forming an axis and having a piercing point at one end, an indicator angularly displaceable about such axis, a member, means for rectilinearly guiding said member, and means whereby movement of said member compels a proportionate angular displacement of the indicator.

2. In an instrument of the class described, an indicator rotatable about a fixed axis, a member, means for rectilinearly guiding said member, a gear rack on said member, gear teeth on the indicator concentric with the axis thereof and adapted to engage the gear rack, and manually operable means engaging said rack to operate said member.

In testimony whereof I affix my signature.

JOHANNES FREDERIK VALKENBURGH.